United States Patent
Schaefers (10) Patent No.: US 9,294,568 B2
(45) Date of Patent: *Mar. 22, 2016

(54) PROVIDING ELECTRONIC CONTENT TO RESIDENTS OF CONTROLLED-ENVIRONMENT FACILITIES

(71) Applicant: Union Supply Group, Inc., Rancho Dominquez, CA (US)

(72) Inventor: Doyle R. Schaefers, Los Alamitos, CA (US)

(73) Assignee: UNION SUPPLY GROUP, INC, Rancho Dominquez, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/479,594

(22) Filed: Sep. 8, 2014

(65) Prior Publication Data

US 2014/0379843 A1 Dec. 25, 2014

Related U.S. Application Data

(63) Continuation of application No. 13/295,277, filed on Nov. 14, 2011, now Pat. No. 8,832,374.

(51) Int. Cl.
| | |
|---|---|
| G06F 13/00 | (2006.01) |
| G06F 13/28 | (2006.01) |
| H04L 29/08 | (2006.01) |
| G06F 21/10 | (2013.01) |
| G06F 21/32 | (2013.01) |
| G06F 21/62 | (2013.01) |

(52) U.S. Cl.
CPC ............ *H04L 67/1097* (2013.01); *G06F 21/10* (2013.01); *G06F 21/32* (2013.01); *G06F 21/6209* (2013.01)

(58) Field of Classification Search
CPC . H04W 12/06; H04L 63/0428; H04L 63/062; H04L 63/08; H04L 63/083
USPC .......................................................... 713/155
See application file for complete search history.

(56) References Cited

U.S. PATENT DOCUMENTS

| | | | | |
|---|---|---|---|---|
| 2007/0186212 | A1* | 8/2007 | Mazzaferri et al. | 718/1 |
| 2008/0316314 | A1* | 12/2008 | Bedell et al. | 348/148 |
| 2009/0013196 | A1* | 1/2009 | Ito et al. | 713/193 |
| 2009/0125717 | A1* | 5/2009 | Suzuoki et al. | 713/166 |
| 2010/0313263 | A1* | 12/2010 | Uchida et al. | 726/18 |
| 2011/0215921 | A1* | 9/2011 | Ben Ayed et al. | 340/539.11 |
| 2011/0252464 | A1* | 10/2011 | Sanjeev | 726/7 |

* cited by examiner

*Primary Examiner* — Ali Abyaneh
*Assistant Examiner* — Stephen Sanders
(74) *Attorney, Agent, or Firm* — Fogarty, L.L.C.

(57) ABSTRACT

Systems and methods for providing electronic content and applications to residents of controlled-environment facilities are disclosed. The portable computing device may be configured to determine that an external memory has been coupled to it. The external memory may include content requested by the resident and a key configured to allow the device to access the content to the exclusion of other devices associated with other residents. The portable computing device may retrieve the key from the external memory and allow the resident to view or play the content if the key matches a lock programmed within the device. If the resident attempts to insert a non-authorized external memory into the device, its contents may be erased and/or an alert may be generated. The content of the external memory may be transferred to the portable computing device and then the external memory may be locked so that it is unusable.

24 Claims, 6 Drawing Sheets

PROVIDING ELECTRONIC CONTENT TO RESIDENTS OF CONTROLLED-ENVIRONMENT FACILITIES

CROSS-REFERENCE TO RELATED APPLICATIONS

The present application claims priority to, and is a continuation of U.S. patent application Ser. No. 13/295,277, which was filed on Nov. 14, 2011, and issued as U.S. Pat. No. 8,832,374 on Sep. 9, 2014, the disclosure of which is hereby incorporated by reference herein in its entirety.

TECHNICAL FIELD

This specification relates generally to systems and methods for providing electronic content and applications to residents of controlled-environment facilities and, more specifically, to controlling what electronic content and applications may be used on a particular device.

BACKGROUND

In the United States, inmates may have access to certain forms of entertainment. In particular, some prisons and jails may allow inmates to listen to audio content (e.g., music, audiobooks, etc.) stored in Compact Discs (CDs), cassette tapes, or the like. Similarly, inmates may also watch video content (e.g., movies, TV shows, etc.) stored in Digital Versatile Discs (DVDs) or Video Home System (VHS) tapes.

A typical prison may have a limited media library from which inmates can select content. Prison staff may then collect and deliver each of the inmates' requested media. Ordinarily, the staff must account for every CD, DVD, cassette tape, and VHS tape during the normal course of operations so that, for example, inmates may not hold more than their maximum allowed number of albums at a given time. In some cases, content may be lost in connection with inmate cell searches, etc. In other cases, inmates have used disc and tape parts as weapons.

Accordingly, the inventors hereof have recognized that the various tasks and concerns associated with traditional content distribution within correctional facilities can impose significant administrative, financial, and security burdens on those facilities.

SUMMARY

Embodiments disclosed herein are directed to systems and methods for providing electronic content to residents of controlled-environment facilities. In an embodiment, a portable computing device (e.g., an MP3/MP4 player, a portable video player, an e-book reader, a gaming device, etc.) may be associated with a resident of a controlled-environment facility, and it may include a processor and an internal memory. The internal memory may be configured to store program instructions executable by the processor to determine that an external memory (e.g., SD card, USB drive, etc.) has been coupled to the device. The external memory may include content (e.g., music, videos, e-books, games, etc.) requested by the resident and a key configured to allow the device to access the content to the exclusion of other devices associated with other residents of the same facility (e.g., non-authorized devices). For example, the portable computing device may retrieve the key from the external memory and, in response to the key matching a lock programmed within the device, allow the resident to view, play, or otherwise reproduce the content.

In various embodiments, the resident of the controlled-environment facility may be an inmate, prisoner, detainee, etc., and the controlled-environment facility may be a prison, jail, or the like. Also, the key (stored in the external memory) and/or lock (present in the portable computing device) may be hardware- and/or software-based.

In some implementations, a resident's portable computing device (e.g., an inmate's device) may be configured such that, in response to the external memory having been inserted into another device associated with another resident of the controlled-environment facility (e.g., another inmate's device), the electronic content may be deleted from the external memory. Additionally or alternatively, the device may be configured to alert a third-party (e.g., prison staff, an investigator, etc.) under certain conditions, such as upon detection of an attempt to use unauthorized memory devices or content.

In some cases, the external memory may include a biometric signature (e.g., a fingerprint, a voice print, etc.) and the portable computing device may be configured to obtain biometric information from a user or operator (e.g., a resident of the controlled-environment facility). In response to matching the obtained biometric information with the stored biometric signature, the portable computing device may be granted access to the electronic content. Additionally or alternatively, the external memory may include a location designation (e.g., a jail cell, a hall, a wing, etc.) where content may be accessed, and the electronic computing device may be configured to receive current location information (e.g., GPS information, wireless signal strength of particular access point, etc.) within the controlled-environment facility. Accordingly, in response to the current location information matching the location designation, the portable computing device may access the electronic content.

In another embodiment, a memory device may include a memory module configured to store content requested by a resident of a controlled-environment facility. The memory device may also include a memory controller coupled to the memory module, where the memory controller is configured to retrieve a key stored in the memory device, and where the key may be configured to allow reproduction of the content by a portable computing device associated with the resident to the exclusion of another portable computing device not associated with the resident, and where the retrieval of the key may take place in response to the memory device being accessed by the portable computing device.

In some implementations, the memory controller may be further configured to cause the content to be blocked or deleted from the memory module in response to the memory device having been inserted into another (e.g., non-authorized) portable computing device. Additionally or alternatively, the memory controller may be further configured to cause the other computing device to alert a selected party. The memory device may further include a biometric signature and/or a location designation stored thereon, and the memory controller may be further configured to enable the portable computing device to unlock the content in response to the biometric signature and/or location designation matching biometric and/or current location information obtained by the portable computing device.

In yet another embodiment, a tangible computer-readable storage medium may include program instructions stored thereon that, upon execution by one or more computer systems, cause the one or more computer systems to receive, from a resident of a controlled-environment facility, a request for content reproducible by a portable computing device associated with the resident. The program instructions may also cause the one or more computer systems to store a key onto a memory device external to the portable computing device. For example, the key may be associated with the device, and it may be configured to allow access of the content by the portable computing device and to disallow access of the electronic content by other devices associated with other residents. The program instructions may further cause the one or more computer systems to transfer the requested content onto the memory device.

In some implementations, the program instructions, upon execution by the one or more computer systems, may further cause the one or more computer systems to identify a content reproduction restriction associated with the resident and store an instruction onto the memory device indicative of the content reproduction restriction. As an example, the instruction may be configured to either block or delete the content from the memory device in response to the memory device having been inserted into another device not associated with the requesting resident.

In other implementations, the program instructions, upon execution by the one or more computer systems, may further cause the one or more computer systems to identify shipping information usable to cause the memory device to be physically delivered to the resident within the controlled-environment facility. Additionally or alternatively, the memory device may be in possession of the resident prior to the content transfer, and the one or more computer systems may transmit the content to the memory device over a communications network.

The program instructions, upon execution by the one or more computer systems, may also cause the one or more computer systems to receive a biometric signature associated with the resident and store the biometric signature onto the memory device, where the portable computing device is configured to obtain access to the content in response to having received biometric information matching the biometric signature. Furthermore, the one or more computer systems may also receive a location designation associated with the resident and store the location designation signature onto the memory device, where the portable computing device is configured to obtain access to the content in response to having received current location information matching the location designation.

In some embodiments, one or more of the operations described herein may be performed by one or more computer systems. In other embodiments, a tangible computer-readable storage medium may have program instructions stored thereon that, upon execution by one or more computer systems, cause the one or more computer systems to execute one or more operations disclosed herein. In yet other embodiments, a system may include at least one processor and a memory coupled to the at least one processor, where the memory is configured to store program instructions, and where the program instructions are executable by the at least one processor to execute one or more operations disclosed herein.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods for providing electronic content to residents of controlled-environment facilities. Various types of controlled-environment facilities are present in today's society, and persons may be voluntary or involuntary residents of such facilities, whether temporarily or permanently. Some examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. Other examples of controlled-environment facilities may include governmental or non-governmental facilities that are secured, have restricted access, and/or handle classified or other confidential information (e.g., the National Security Agency (NSA), the Central Intelligence Agency (CIA), etc.).

For convenience of explanation, various examples discussed herein are presented in the context of correctional facilities. For instance, in some of the embodiments discussed below, a controlled-environment facility may be referred to as a jail or prison, and its residents may be referred to as arrestees, detainees, or inmates. It should be understood, however, that the systems and methods described herein may be similarly applicable to other types of controlled-environment facilities and their respective residents (e.g., a hospital and its patients, a school dormitory and its students, etc.).

Figure 1:
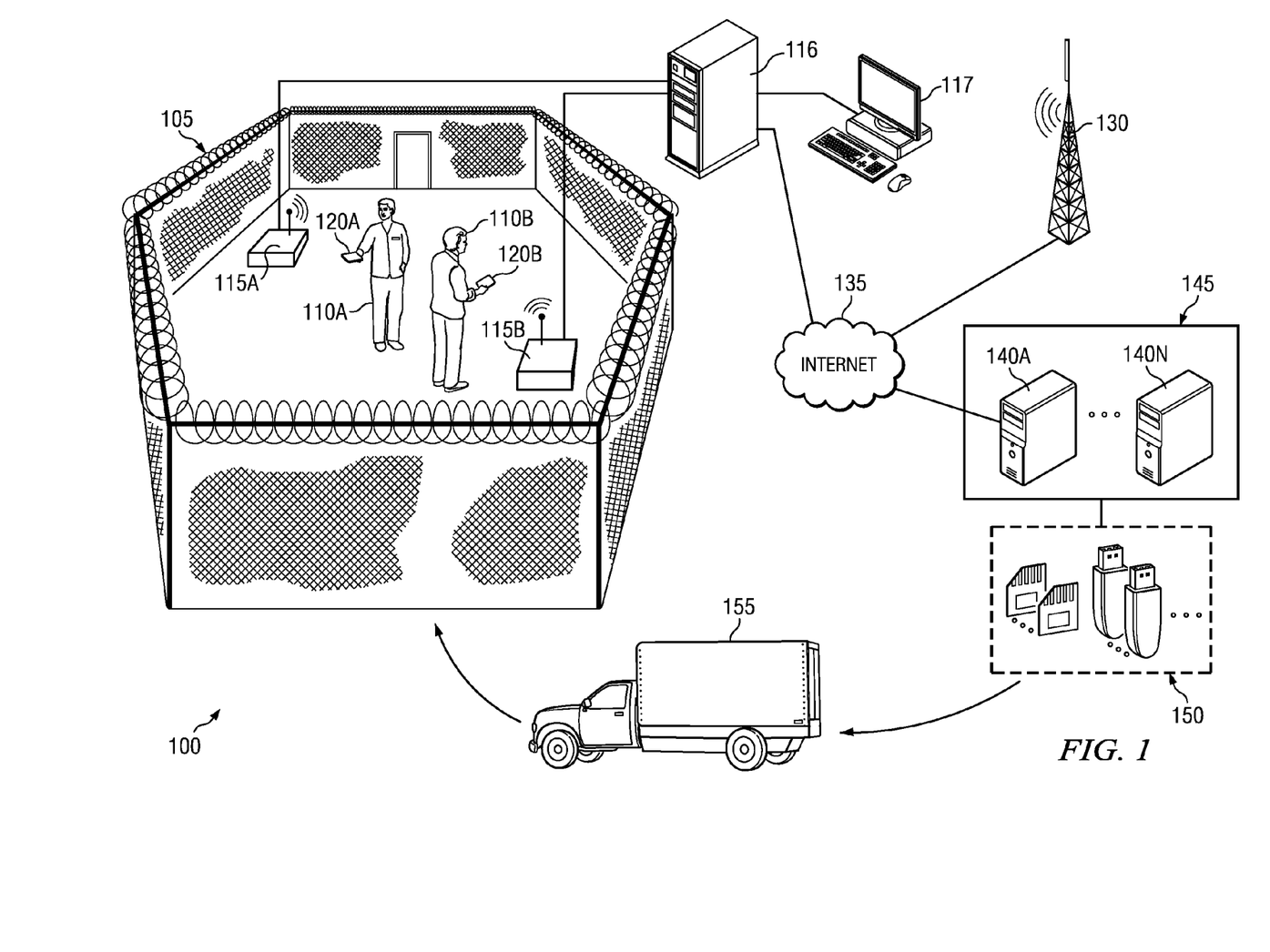
FIG. 1 is a diagram of a controlled-environment facility served by an electronic content vendor according to some embodiments.

Turning now to FIG. 1, a diagram of a controlled-environment facility served by an electronic content vendor is depicted according to some embodiments. As illustrated, inmates 110A/B are incarcerated within correctional facility 105. Each inmate may be confined in a different area, cell, hall, wing, etc. of facility 105. In some cases, each such area may have its own connectivity device 115A/B, which in turn may be configured to provide information services inside facility 105. For example, connectivity devices 115A/B may include wireless network access points (e.g., WiFi routers, etc.), wired access points, (e.g., Ethernet hubs), radio frequency identification (RFID) devices, cellular telephone stations, or the like. In some implementations, a single connectivity device may provide two or more such services. Further, in some cases, connectivity devices 115A/B may be provided in kiosks or other types of stations distributed within facility 105.

Inmates 110A/B may each be assigned his or her own portable computing device 120A/B (e.g., an MP3/MP4 player, a video player, an e-book reader, a gaming device, a tablet computer, etc.). Non-limiting examples of such devices are illustrated in more detail with respect to FIGS. 2 and 3 below. Generally speaking, portable computing devices 120A/B may be configured with operating system software that limits their functionality as required by the security rules and/or restrictions of facility 105. For example, portable computing device 120A may be assigned to inmate 110A to the exclusion of other inmates (e.g., inmate 110B), such that only inmate 110A is ordinarily able or allowed to operate device 120A (e.g., device 120A may be programmed or hardwired with inmate 110A's identification code, number, or the like).

Also, computing devices 120A/B may be configured to communicate with connectivity devices 115A/B in order to allow inmates 110A/B to request electronic content (e.g., music, audiobooks, movies, TV shows, games, etc.). Computing devices 120A/B may connect directly to connectivity devices via a wireless or wired connection. Alternatively, computing devices 120A/B may have no capability to connect directly with other devices. In some cases, the electronic content may be physically delivered to the requesting inmate and then loaded onto the inmate's computing device 120. In other cases, the content may be delivered electronically (e.g., through connectivity devices 115A/B). In yet other cases, the content may be immediately streamed to devices 120A/B. Portable computing devices 120A/B may also be configured to communicate with connectivity devices 115A/B in order to obtain permission to reproduce certain electronic content, whether the content is physically or electronically delivered.

Prison 105 includes one or more gateway systems 116 that enable communications with electronic content vendor 145, such as through cellular network 130, Internet 135, or a combination of various wireless or wired networks. Vendor facility 145 may include one or more computer systems 140A-N configured to communicate with entities within prison facility 105, receive inmate requests for content, and deliver the requested content. The content may be delivered via physical, external memories 150 (e.g., using transport system 155) and/or electronically (e.g., via Internet 135). Non-limiting examples of external memories 150 are illustrated in more detail with respect to FIG. 4, and non-limiting examples of computer systems 140A-N are illustrated in more detail with respect to FIG. 5.

In one embodiment, gateway 116 may be used to control inmates' 110A/B and devices' 120A/B access to connectivity devices 115A/B, Internet 135, vendor facility 145, computer systems 140A-N, and/or any other network, network node, content, or application. Gateway 116 may provide dynamic authentication of devices 120A/B and thereby set the devices' level of access. Prison facility 105 may establish multiple security levels or access levels to be assigned to devices 120A/B and/or inmates 110A/B.

The security or access levels may be used to control the type of content and extent of network access allowed for each user or device. For example, a first level may allow no access so that the inmate 110A/B is limited to using device 120A/B as a stand-alone unit with access only to otherwise allowed existing content. A second level may allow access to music, movies or other passive content available via connectivity devices 115A/B, Internet 135, vendor facility 145, or computer systems 140A-N. A third level may allow access to games or other interactive content and applications. A fourth level may provide the highest level of access and allow the inmate and device to transmit or broadcast content, such as sending emails or participating in virtual visitation with friends and family via device 120A/B.

Administrators of prison facility 105 may use an administration terminal 117 to define the access or security levels and to identify the type of access allowed for each level. Administrators may also use terminal 117 to set an access level for each inmate 110A/B or device 120A/B. In one embodiment, administrators may change the access level for an inmate 110A/B or device 120A/B at any time, thereby modifying the type of access allowed for the inmate or device in real time.

In one embodiment, when device 120A/B is powered-on, the device communicates with a connectivity device 115A/B or some other access point and registers with gateway 116. The device's 120A/B security level is updated by gateway 116. Then, the device 120A/B is allowed the corresponding level of access during operation. In some embodiments, device 120A/B must periodically re-register with gateway 116 during operation. This allows updates or changes to the security level to be applied to device 120A/B at times other than initial registration with connectivity device 115A/B or gateway 116. For example, when device 120A/B registers with gateway 116, the device 120A/B is granted a certain level of initial access. At a predetermined time or interval, device 120A/B re-registers with gateway 116 and is assigned an updated access level. Accordingly, an administrator may upgrade, degrade, or remove the inmates' 110A/B ability to access connectivity devices 115A/B, Internet 135, vendor facility 145, computer systems 140A-N, and/or any content or application.

Environment 100 shown in FIG. 1 is depicted with a single correctional facility 105 for simplicity of illustration only. It should be understood, however, that in other situations two or more facilities may be served by the same vendor 145. In those cases, the two or more facilities may each have their own requirements or regulations. Accordingly, vendor 145 may be configured to identify the origin of an inmate's request, for example, and apply the appropriate procedure for providing and/or distributing the electronic content. For instance, facility A (e.g., a federal prison in jurisdiction A) may allow its inmates to have a limited number of songs (or amount of data, etc.) in their players, whereas facility B (e.g., a county jail in jurisdiction B) may impose a different restriction regarding the maximum number of songs allowed on the players. Other restrictions that may be implemented differently across various facilities (or within different inmate populations or areas of the same facility) include, but are not limited to, a time of the day, week, or month when certain inmates are allowed to make content requests, allowed content format extensions (e.g., AIFF, WAV, MP3, AAC, QuickTime, H.261, MPEG-1, MPEG-2, Realvideo, WMV, etc.), content type restrictions (e.g., music, movies, music videos, e-books, games, etc.), content genre restrictions (e.g., rock, rap, comedy, drama, TV shows, fiction, etc.), a location within the facility where content may be reproduced, whether content may be reproduced in the presence or other inmates, etc.

In some cases, two or more vendors similar to vendor 145 may serve correctional facility 105. For example, a first vendor may be capable of providing a first type of content (e.g., music and music videos) whereas a second vendor may provide a second type of content (e.g., movies and other video). Each such vendor may maintain a catalog of available content (e.g., a hardcopy or web-based catalog), and the inmate may access the catalog using procedures prescribed by his or her facility. Moreover, in some cases vendor 145 may be configured to receive inmate requests, perform clearance and/or permission checks, retrieve the requested content from other content repositories or vendors (e.g., ITUNES®, AMAZON.COM®, etc.), and provide the content to the inmate as otherwise discussed herein.

Figure 2:
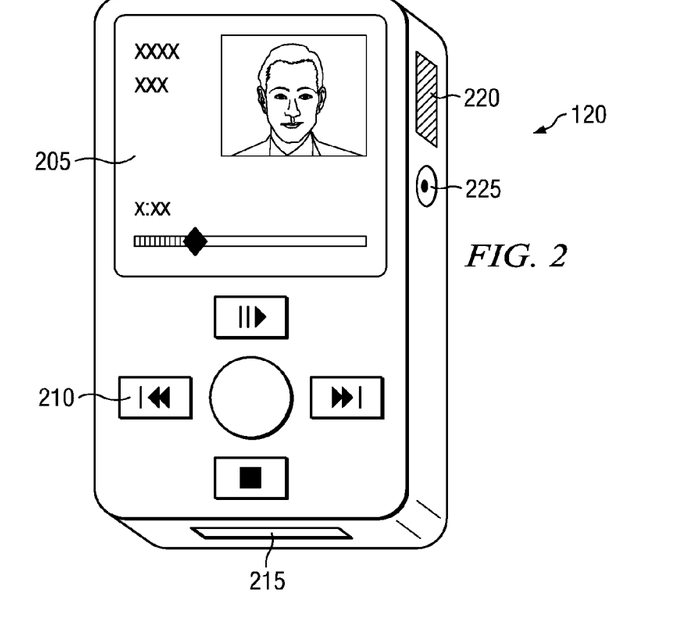
FIG. 2 is a perspective view of a portable media or computing device according to some embodiments.

FIG. 2 is a perspective view of portable media device 120 according to some embodiments. In various embodiments, device 120 may be used as computing devices 120A and/or 120B in FIG. 1. As illustrated, device 120 includes display 205 (e.g., an LCD display, or the like), player controls 210, external memory slot 215, fingerprint scanner 220, and microphone 225. Display screen 205 is configured to allow a user (e.g., inmates 110A or B) to interact with device 120. For example, display 205 may be configured to display information regarding the electronic content that is available on device 120, a playback status, etc. Controls 210 may include physical push buttons, capacitive controls, or the like. In various embodiments, controls 210 may allow the operator to turn device 120 on and off, navigate through one or more menus, select items within those menus, and also control the reproduction of the electronic content (e.g., play/pause, rewind, forward, stop, etc.). Other operations such as, for example, requesting and/or purchasing content, connecting to wireless or wired devices 115A/B, etc. may also be performed using controls 210 in some embodiments.

Fingerprint scanner 220 and microphone 225 may be any suitable scanner and microphone configured to obtain one or more biometric signatures from the user. In some cases, operation of device 120 may require that the user provide one or more biometric samples matching stored biometric signatures. Memory slot or bay 215 may be an SD card slot, a USB port, or the like. In some cases, device 120 is configured to reproduce or play electronic content stored in an external memory, which is coupled to device 120 through slot 215. In other cases, device 120 may have limited operability and/or become inoperable in the absence of an external memory connected to device 120 through slot 215.

It should be understood that components 205-225 are shown for illustration purposes only, and that different versions of device 120 may include more or less components, arranged in other suitable ways. For example, a camera may be included within device 120 to enable facial or iris recognition as additional biometric devices, as well as to enable other operations, such as video visitations, etc. Additionally or alternatively, an RFID reader may be deployed on device 120 to allow device 120 to detect and/or read nearby RFID bracelet(s), anklet(s), and similar inmate identification or tracking devices. In some cases, display 205 may be a capacitive touch screen or the like, and one or more of controls 210 may be absent from device 120. Screen 205 may allow the user to provide inputs to device 120 by selecting, for example, icons displayed on screen 205.

Figure 3:
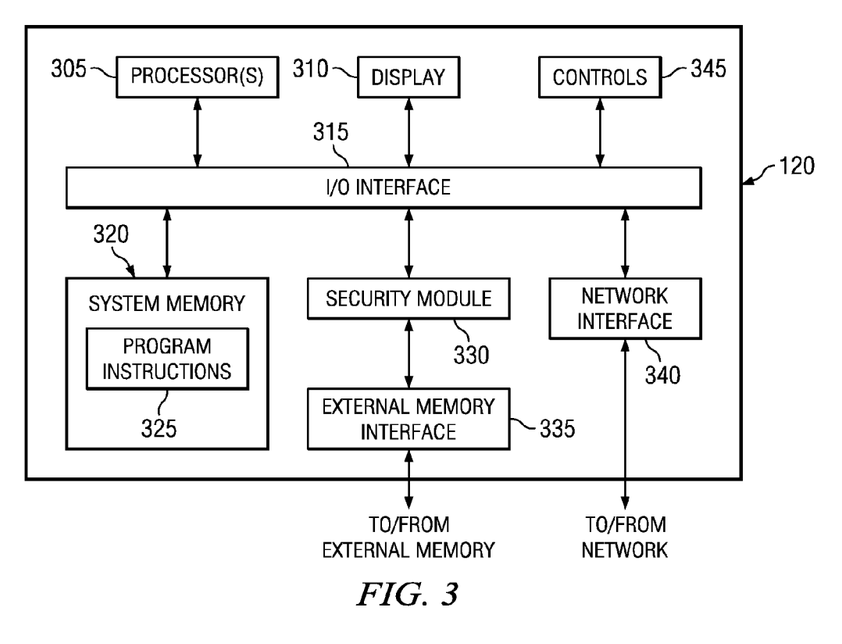
FIG. 3 is a block diagram of the portable media device or computing according to some embodiments.

FIG. 3 is a block diagram of portable media device 120 according to some embodiments. One or more processor(s) 305 may include any processor capable of executing program instructions. For example, in various embodiments, processor 305 may be a general-purpose or embedded processor implementing any of a variety of instruction set architectures (ISAs), such as the x86, POWERPC®, ARM®, SPARC®, or MIPS® ISAs, or any other suitable ISA. System memory 320 may be configured to store program instructions 325 and other data accessible by processor 305. In one embodiment, system memory 320 is also configured to store software, programs, instructions, applications, or other content received from an external memory device (via external memory interface 335) or from an external network (via network interface 340). System memory 320 may be used to store authentication credentials or authentication data that is used to register with a prison facility network. The software, programs, instructions, applications, or other content received from external sources may be used by processor 305 to operate device 120 or provided to a user as information or entertainment via display module 310, for example. The applications may include mobile applications, such as GOOGLE APPS™ or ANDROID™ apps, or program instructions for electronic mail, web browser, task management, scheduling, and/or calendar applications. In various embodiments, system memory 320 may be implemented using any suitable memory technology, such as static random access memory (SRAM), synchronous dynamic RAM (SDRAM), nonvolatile/Flash-type memory, or any other type of memory. In some embodiments, program instructions 325 may include a mobile operating system such as, for example, ANDROID™, BLACKBERRY® operating system, iOS®, Symbian, Windows Phone™, webOS, or the like. In some cases, the operating system may be "stripped down" of certain functionality in order to meet security concerns or requirements of correctional facility 105.

As illustrated, display module 310 may include an LCD interface or the like configured to operate display 205, and control module 345 may include any suitable control interface for allowing a user to interact with device 120 using controls 210. In other embodiments, display module 310 may provide an interface to a visual display, such as display 205, and/or an audio output (not shown), such as a speaker or headphones, and/or a tactile output (not shown), such as a vibration or force feedback device. In an embodiment, I/O interface 315 may be configured to coordinate I/O traffic between processor 305, system memory 320, display module 310, security module 330 and/or external memory interface 335, network interface 340, and control module 345. For example, I/O interface 315 may perform any necessary protocol, timing or other data transformations to convert data signals from one component (e.g., system memory 320) into a format suitable for use by another component (e.g., processor 305). In some embodiments, some or all of the functionality of I/O interface 315, such as an interface to system memory 320, may be incorporated into processor 305.

In various embodiments, external memory interface 335 may allow an external memory device (e.g., device 150 in FIG. 1) to be coupled to, and to communicate with, portable computing device 120. Security module 330 may determine whether portable computing device 120 is allowed to access the contents of the external memory and vice-versa. Although shown as separate modules, in some implementations security module 330 and external memory interface 335 may be deployed as a single chipset. In yet other implementations, certain operations ordinarily performed by security module 330 may be instead incorporated into program instructions 325 and performed by processor 305.

Network interface 340 may be configured to allow data to be exchanged between device 120 and other devices attached to a network, such as devices 115A/B shown in FIG. 1. Additionally, in some embodiments, network interface 340 may allow data to be exchanged with one or more computer systems 140A-N of vendor facility 145 (e.g., to allow a request for electronic content to be received by vendor 145 over Internet 135). In various embodiments, network interface 340 may support communication via wired or wireless general data networks, such as any suitable type of Ethernet network, for example, via telecommunications/telephony networks such as analog voice networks or digital fiber communications networks, or via any other suitable type of network and/or protocol.

In some embodiments, device 120 may be capable of determining its physical or geographic location within facility 105. For example, device 120 may include a global positioning satellite (GPS) module (not shown) that allows it to pinpoint its location by latitude and longitude. Additionally or alternatively, device 120 may be able to detect the relative strengths of other signals within facility 105 and therefore determine its approximate location. For example, as illustrated in FIG. 1, portable computing device 120A may receive a stronger signal from connectivity device 115A than from 115B, and therefore determine that it is closer to the former. In addition, portable computing device 120 may be able to triangulate its position within facility 105 by monitoring two or more connectivity devices 115A/B.

Figure 4:
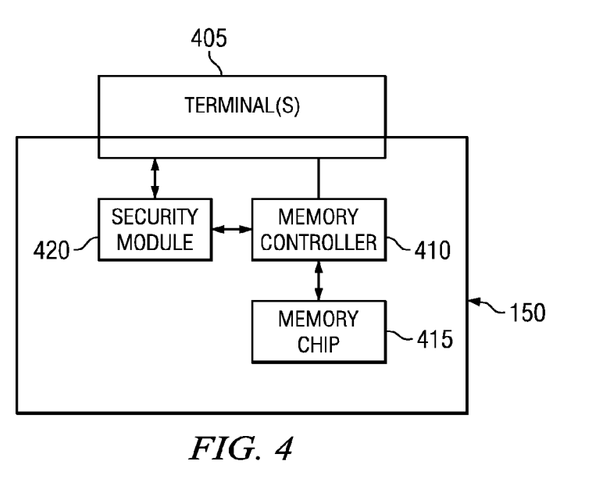
FIG. 4 is a block diagram of an external memory device according to some embodiments.

FIG. 4 is a block diagram of external memory 150 according to some embodiments. In various implementations, external memory 150 may be a USB drive or a memory card such as, for example, an MMCcard, an RS-MMCcard, an MMC Pluscard, a SecureMMCcard, an SDcard, an SDIOcard, a miniSDcard, a microSDcard, or the like. Electric terminals and memory I/O interface 405 are connected to security module 420 and memory controller 410. Memory chip 415 is coupled to memory controller 410. In alternative implementations, security module 420 may be built into or otherwise incorporated into memory controller 410. Moreover, memory chip 415 may be a Flash memory or some other non-volatile computer storage chip capable of being be electronically erased and reprogrammed. In general, controller 410 may be configured to allow and/or coordinate access to memory chip 415, for example, by portable computer device 120 and/or computer system(s) 140A-N.

In some embodiments, memory chip 415 may be programmed with electronic content requested by a particular inmate of correctional facility 105. Memory chip 415 may also be programmed with a software or hardware key (e.g., an encryption key or a security chipset) that associates external memory device 150 with the portable media device 120 belonging to the particular inmate. Additionally or alternatively, memory chip 415 may be programmed with one or more biometric signatures (e.g., fingerprint(s), voice samples, etc.) belonging to the particular inmate, one or more playback location designations (e.g., device 120 may only be operated within a particular cell, hall, wing, or area within facility 105) associated with that inmate, and/or other information usable to enforce content restrictions.

In a first mode of operation, memory device 150 may determine whether a lock stored in portable media device 120, an item of biometric information obtained from an operator of device 120, or a current location of device 120 matches the information stored in memory chip 415. Memory device 150 may also determine whether other restrictions are cleared. If there is a match, the electronic content on device 150 may become accessible to device 120; otherwise a security protocol may be implemented by security module 420 and/or memory controller 410 to cause the content to be blocked or erased from chip 415, to cause device 120 to trigger an alert to prison staff or other authorities, etc. In a second mode of operation, external memory 150 may provide the key, signature, and/or other restriction information to device 120, and device 120 may verify and/or enforce these restrictions. These and other operations are described in more detail with respect to FIG. 6 below.

Figure 5:
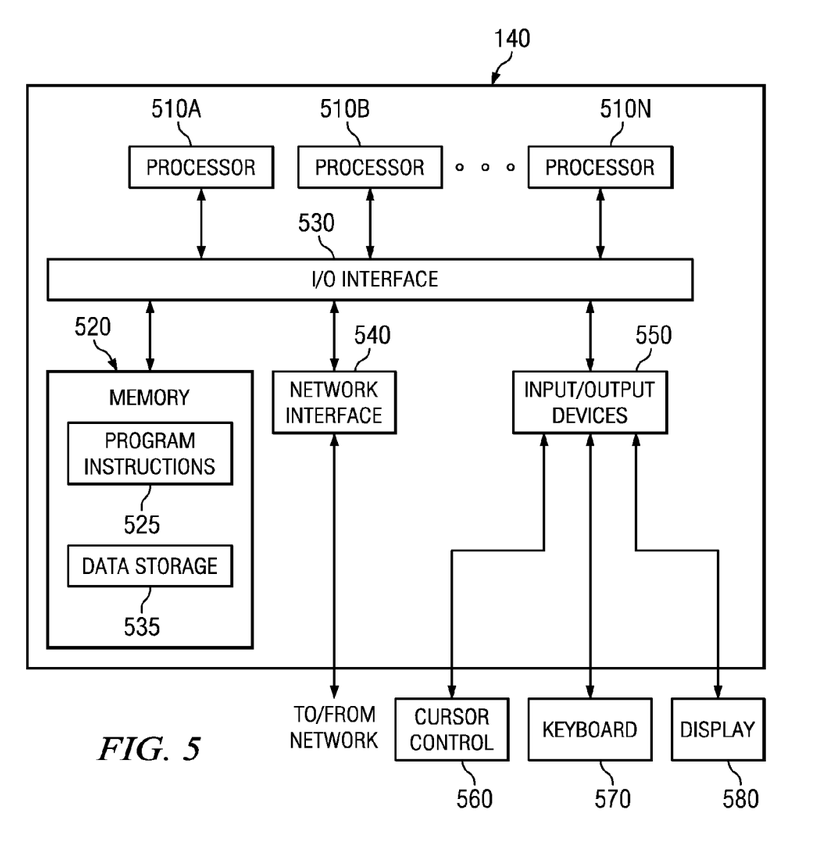
FIG. 5 is a block diagram of a computer system operated by a content vendor according to some embodiments.

Embodiments of systems and methods for providing electronic content to residents of controlled-environment facilities, as described herein, may be implemented or executed at least in part by one or more computer systems 140A-N (140) of vendor 145 shown in FIG. 1. An example of such a computer system is illustrated in FIG. 5. In various embodiments, computer system 140 may be a server, a mainframe computer system, a workstation, a network computer, a desktop computer, a laptop, or the like. For example, in some cases, each of computer systems 140A-N shown in FIG. 1 may be implemented similarly to computer system 140.

As shown, computer system 140 includes one or more processors 510A-C coupled to system memory 520 via I/O interface 530. Computer system 140 further includes network interface 540 coupled to I/O interface 530, and one or more input/output devices 550, such as cursor control device 560, keyboard 570, and display(s) 580. In some embodiments, electronic content vendor 145 may include a single instance of computer system 140, while in other embodiments multiple such systems, or multiple nodes making up computer systems 140A-N, may be configured to host different portions or instances of embodiments. For example, in an embodiment some elements may be implemented via one or more nodes of computer systems 140A-N that are distinct from those nodes implementing other elements (e.g., a first computer system may handle the sales of electronic content while another computer system may implement the transfer of the electronic content or encryption keys, etc., to external memory 150).

In various embodiments, computer system 140 may be a single-processor system including one of processors 510A-N, or a multi-processor system including two or more processors 510A-N (e.g., two, four, eight, or another suitable number). Processors 510A-N may be any processors capable of executing program instructions. For example, in various embodiments, processors 510A-N may be general-purpose or embedded processors implementing any of a variety of ISAs. In multi-processor systems, each of processors 510A-N may commonly, but not necessarily, implement the same ISA. Also, in some embodiments, at least one of processors 510A-N may be a graphics processing unit (GPU) or other dedicated graphics-rendering device.

System memory 520 may be configured to store program instructions and/or data accessible by processors 510A-N. In various embodiments, system memory 520 may be implemented using any suitable memory technology. As illustrated, program instructions and data implementing certain operations such as, for example, those described in FIG. 7 below, may be stored within system memory 520 as program instructions 525 and data storage 535, respectively. In other embodiments, program instructions and/or data may be received, sent or stored upon different types of computer-accessible media or on similar media separate from system memory 520 or computer system 140. Generally speaking, a computer-accessible medium may include any tangible storage media or memory media such as magnetic or optical media—e.g., disk or CD/DVD-ROM coupled to computer system 140 via I/O interface 530. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 540.

In an embodiment, I/O interface 530 may be configured to coordinate I/O traffic between processors 510A-N, system memory 520, and any peripheral devices, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processors 510A-N). In some embodiments, I/O interface 530 may include support for devices attached through various types of peripheral buses, such as a variant of the PCI bus standard, the USB standard, etc. In some embodiments, the function of I/O interface 530 may be split into two or more separate components, such as a north bridge and a south bridge, for example. In addition, in some embodiments some or all of the functionality of I/O interface 530, such as an interface to system memory 520, may be incorporated directly into processors 510A-N.

Network interface 540 may be configured to allow data to be exchanged between computer system 140 and other devices attached to a network, such as other computer systems. Additionally, in some embodiments, network interface 540 may allow data to be exchanged with an order processing system within controlled-environment facility 105 (e.g., to allow an order for electronic content to be received over Internet 135). In various embodiments, network interface 540 may support communication via wired or wireless general data networks, such as any suitable type of Ethernet network, for example, via telecommunications/telephony networks such as analog voice networks or digital fiber communications networks, via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or retrieving data by one or more computer system 140. Multiple input/output devices 550 may be present in computer system 140 or may be distributed across various computer systems 140A-N. In some embodiments, similar input/output devices may be separate from computer systems 140A-N and may interact with one or more computer systems 140A-N through a wired or wireless connection, such as over network interface 540.

As shown in FIG. 5, memory 520 may include program instructions 525, configured to implement certain embodiments described herein, and data storage 535, comprising various data accessible by program instructions 525. In an embodiment, program instructions 525 may include software elements of embodiments illustrated in the figures below. For example, program instructions 525 may be implemented using any desired programming language, scripting language, or combination of programming languages and/or scripting languages (e.g., C, C++, C#, JAVA™, JAVASCRIPT™, Perl, etc.). Data storage 535 may include data that may be used in these embodiments. In other embodiments, other or different software elements and data may be included.

A person of ordinary skill in the art will appreciate that portable computing device 120, computer system 140, and external memory device 150 are merely illustrative and not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other portable computing device 120, computer system 140, and/or external memory device 150 configurations.

Figure 6:
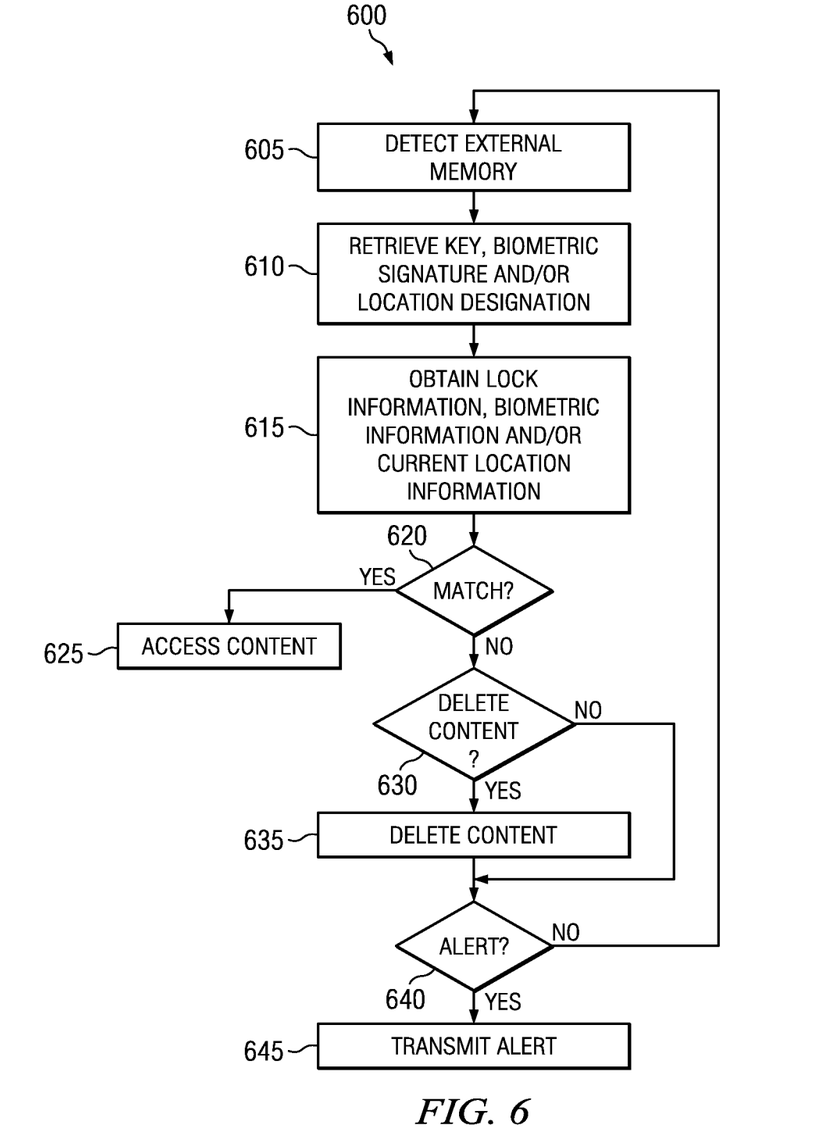
FIG. 6 is a flowchart of a method for accessing electronic content stored in a memory device according to some embodiments.

FIG. 6 is a flowchart of a method for accessing electronic content stored in a memory device according to some embodiments. In various implementations, method 600 may be performed by portable computing device 120. At block 605, device 120 may detect that external memory 150 has been plugged into port 215. At block 610, device 120 may retrieve a key value, a biometric signature, and/or a location designation stored in memory 150. At 620, device 120 may determine whether the information retrieved from memory 150 matches information obtained by device 120 at block 615. For example, device 120 may determine whether a retrieved encryption key matches a software lock within device 120. Additionally or alternatively, device 120 may determine whether a code or number (e.g., an inmate ID number, a device ID number, etc.) matches corresponding information stored in device 120. Additionally or alternatively, device 120 may determine whether a retrieved biometric signature matches biometric information obtained from an operator of device 120, for example, via fingerprint scanner 220 and/or microphone 225. Additionally or alternatively, device 120 may determine whether a retrieved location designation or restriction matches a current location of device 120. Additionally or alternatively, device 120 may determine the identities of nearby inmates by reading RFID bracelets within range of device 120 (e.g., to determine whether nearby inmates are prohibited from watching or listening to the content).

If at 620, the information retrieved from memory 150 at block 610 matches the corresponding information obtained at block 615 by portable computing device 120 and restriction(s) are otherwise cleared, then device 120 may be granted access to the content stored in memory 150 at block 625. In some embodiments, by checking one or more pieces of information as described herein, it may be assured that only a memory device specifically associated with a particular portable computing device may be used in that device. In other words, when the information does not match at 620, block 625 may provide an indication that an inmate may have inserted a memory card not associated with his or her own portable computing device (or associated with another inmate's device) into the device. Accordingly, at blocks 630-645, device 120 and/or memory 150 may implement a predetermined procedure or protocol to address the security violation. Such protocols may be specific to a given facility, and may vary across different facilities. Furthermore, these protocols may also vary depending on the inmate, the content, the location, and/or the time associated with the security violation.

For example, in cases where the controlled-environment facility is operated by a governmental or non-governmental entity that is interested in tracking which person(s) have accessed classified or confidential information, a security violation may result if a non-authorized person attempts to review the content of memory 150 or memory 320 on device 120. Additionally or alternatively, a security violation may result if, for instance, an otherwise authorized person attempts to review the contents of memory 150 or memory 320 on device 120 outside of a designated or authorized physical location. Additionally or alternatively, a security violation may result if an otherwise authorized person attempts to access the contents of memory 150 or memory 320 on device 120 outside of a specified time window during which review is allowed.

As illustrated, at block 630, device 120 determines whether the content within memory 150 should be erased. If so, the content is deleted in block 635. At block 640, device 120 determines whether an alert should be transmitted to prison staff, investigator(s), etc. If so, the alert may be transmitted at block 645, otherwise control returns to block 605. In other implementations, other security protocols may be implemented. For example, upon detection of a security violation, device 120 may begin reporting all of the user's activities to the prison staff without otherwise altering its operation, thus providing additional data that may be useful to investigators. In other embodiments, upon detection of the violation, the content stored in the memory device may be temporarily blocked, the offending inmate may lose certain privileges (e.g., the maximum amount of content allowed to be stored in the device may be reduced), etc. Although each of blocks 605-645 have been described above as being performed by portable computing device 120, it should be understood that one or more of these operations may be performed by memory device 150.

Figure 7:
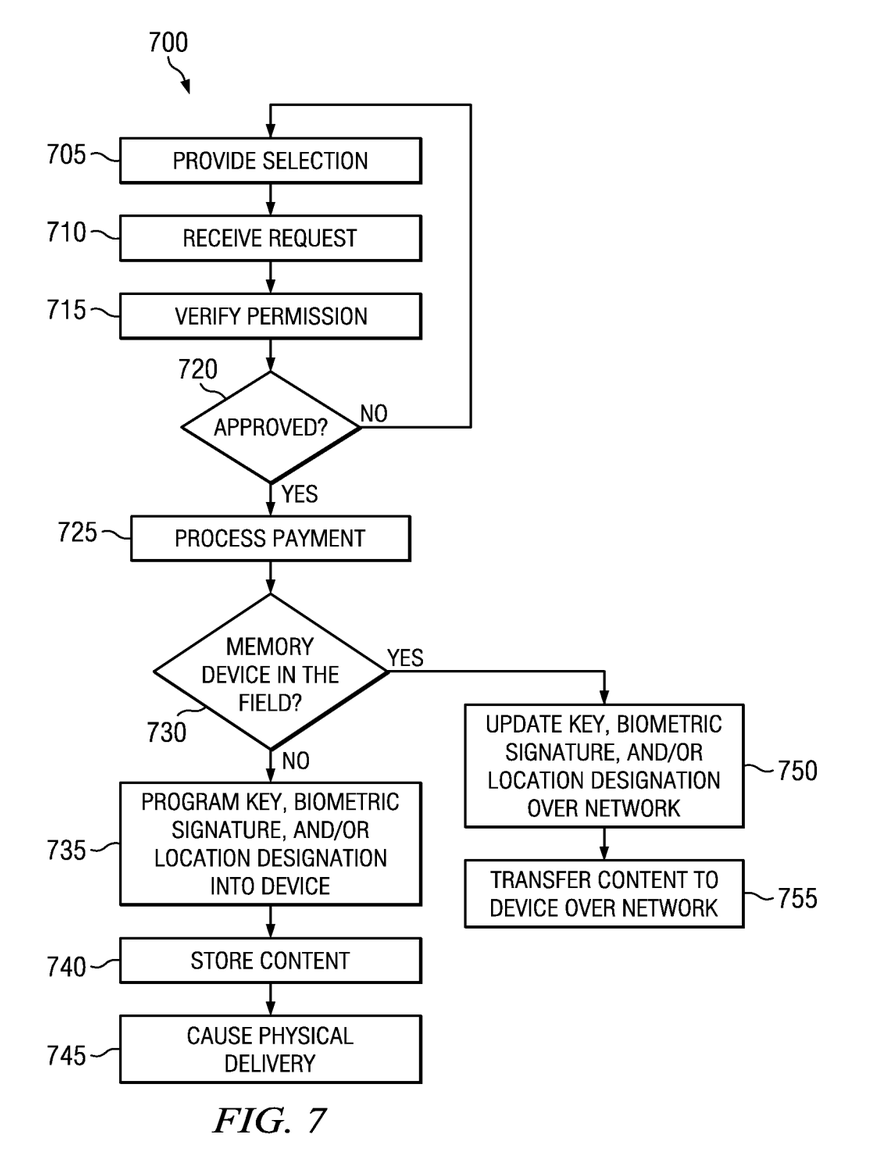
FIG. 7 is a flowchart of a method for providing and/or distributing electronic content according to some embodiments.

FIG. 7 is a flowchart of a method for providing and/or distributing electronic content according to some embodiments. In various implementations, method 700 may be performed by one or more computer systems 140. At block 705, computer system 140 may provide a selection or catalog of available content to facility 105 and/or to inmates 110A/B within facility 105. For example, the selection may be provided via a webpage over Internet 135, by phone, in printed form, etc. At block 710, computer system 140 may receive a request from an inmate for selected content (e.g., a song, an audio book, a video, a movie, a TV show, an e-book, a game, etc.). In some implementations, the request may be received through portable computing device 120, a kiosk within facility 105, via an interactive voice response (IVR) system, via mail courier, through a human operator, or in any other suitable manner. The request may include, for example, an inmate identification (e.g., inmate ID, RFID number, biometric signature, etc.), a facility identification, identification of selected content, payment information (e.g., commissary or trust account numbers, etc.), or the like. In some embodiments the request may also include, for example, a portable computing device identification and/or an external memory device identification, as explained in more detail below.

In response to the request, computer system 140 may, at block 715, verify permissions associated with the requesting inmate and/or the originating facility. For instance, the inmate may be restricted to a certain amount or type of content, and the request may or may not fit the restriction(s) at 720. At block 715, computer system 140 may also verify whether the payment information is valid, if the inmate's account has a sufficient balance, etc. If the request is approved at 720, computer system 140 may process the inmate's payment for the requested content at block 725; otherwise control returns from 720 to block 705.

At block 730, computer system 140 may determine whether there is a memory device (e.g., memory 150) in possession of the requesting inmate. If not, at block 735, computer system 140 may program a software or logic key into a new memory device. In some cases, a unique key may instead be hardwired into each memory device (e.g., in security module 420), and computer system 140 may retrieve the key from the memory device and send a message to the portable computing device 120 of the requesting inmate; thus associating the inmate's device with the hardwired key (and therefore the memory device). Additionally or alternatively, at block 735, computer system 140 may program a biometric signature and/or a location designation associated with the requesting inmate into the memory device. In some cases, the biometric signature and/or the location designation may be obtained a priori by computer system 140 from facility 105. Additionally or alternatively, the biometric signature and/or any location restrictions may be included in the content request or otherwise obtained in connection with the content request. At block 740, computing system 140 may store or load the requested content to memory device 150 and, at block 745, it may cause memory device 150 to be physically distributed to the requesting inmate. For example, computing system 140 may order courier service for example, over Internet 135, and obtain shipment and/or tracking information.

Referring back to block 730, if there a memory device is already in the possession of the requesting inmate, computer system 140 may, in some cases, remotely update the key, biometric signature, and/or location restrictions stored in the deployed memory device over a network (e.g., Internet 135) at block 750. Then, at block 755, computer system 140 may transmit the selected content to the deployed memory card through the network (e.g., Internet 135) and via the inmate's portable computing device. In some cases, content, playback restrictions, and/or other identification information may be pushed to memory device 150 in the absence of an inmate's content request, for example, at the command of facility 105.

In some embodiments, the physical delivery of content of block 745 and the electronic delivery of content at block 755 may be alternative ways of delivering content to residents of the controlled-environment facility. In other embodiments, block 730 may be absent and computer system 140 may always send the requesting inmate a new memory card in response to each new request. For example, the inmate may be required to return a memory card currently in his or her possession prior to receiving a new one, or may have a maximum number of such cards allowed at any given time. In yet other embodiments, the services provided by vendor 145 through computer system 140 may include a subscription, and the inmate may receive a new memory card periodically (e.g., once a month). As previously noted, some implementations of method 700 may leverage content currently available from other vendors (e.g., ITUNES®, AMAZON.COM®, other content repositories, etc.), in which case, block 740 may include additional communications with those vendors over a network in order for computer system 140 obtain the requested content.

As described above, systems and methods disclosed may be particularly suited for distributing electronic content to residents of controlled-environment facilities. Each external memory device (e.g., 150) may be uniquely tied to a particular portable computing device (e.g., 120), such that the content stored thereon cannot be accessed by other inmates and/or reproduced by other portable computing devices. For example, in some cases, the content stored in the portable device may be accessible only if the memory card's key matches the portable device's lock, the card's biometric signature matches the user's biometric sample, the location of the device matches location restrictions stored on the memory card, and/or nearby inmates (detected via an RFID transducer or the like) are allowed to also view the content. Although certain embodiments describe communications using Internet 135, in other implementations these various operations may be performed by a telephone system, an IVR system, etc., and memory cards may be distributed by mail and without a wireless network infrastructure.

In another embodiment, a user having a media player, such as portable computing device 120, receives content on a memory device, such as a USB drive or memory card 150. The memory device is connected to the external memory interface 335 of the media player 120, such as by inserting the memory device into memory slot 215. When the media player detects the memory device, the media player retrieves an encryption key from system memory 320, a register, or some other storage. The encryption key is compared to information retrieved from the memory device. For example, the media player may determine whether the retrieved encryption key matches a software lock on the memory device. If the encryption key and software lock match, then the media player may access content on the memory device.

In one embodiment, the media player may access and play the content directly from the memory device. In other embodiments, the content from the memory device may be transferred to the media player. The content on the memory device may be deleted once it is transferred to the media player. This would prevent other users from attempting to use the content on unauthorized or unlicensed media players. For further protection, once the content is transferred from the memory device, the media player may apply a new software lock or encryption code to the memory device. This would effectively re-lock the memory device and prevent any device without the proper key or code from using the memory device.

In one embodiment, the media player generates or has a list of software locks or encryption codes that can be applied to the memory device after content has been deleted. The media player may not have the corresponding key or decryption code that would be required to unlock the memory device. In that case, the memory device would not be usable by the media player. This arrangement may be useful in situations in which a manufacturer or administrator does not want the media player to be used to export or send content and/or does not want the memory device to carry any content transferred from the media player. The manufacturer, supplier or some third party may have the proper key or code to unlock the relocked memory device or the relocked memory device may be rendered unusable.

Figure 8:
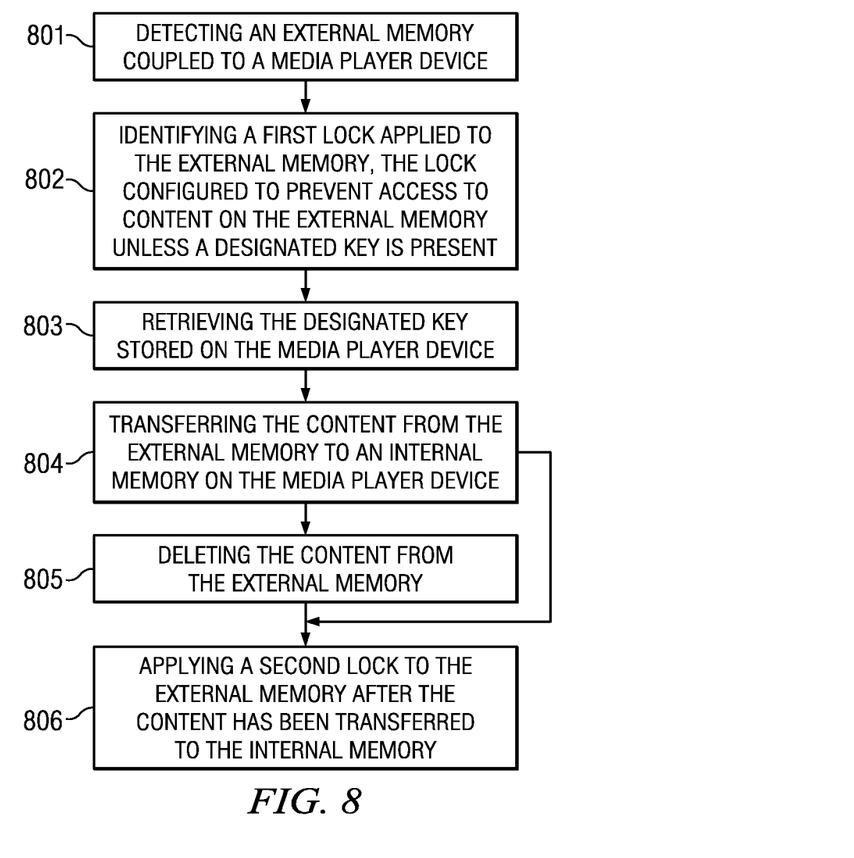
FIG. 8 is a flowchart of a method for accessing electronic content stored in an external memory device according to one embodiment.

FIG. 8 is a flowchart of a method for accessing electronic content stored in an external memory device according to one embodiment. In step 801, an external memory is detected when it is coupled to a media player device. The external memory may be any electronic storage device, such as a USB memory device, flash memory device, or multimedia, CompactFlash (CF), SmartMedia (SM), Memory Stick (MS), Secure Digital (SD), or Subscriber Identity Module (SIM) card or the like. In step 802, the media player device identifies a first lock that has been applied to the external memory. The lock is configured to prevent access to the content on the external memory unless a designated key is present. The lock and key may be associated with software encryption, such as, for example, a public encryption key (lock) and a private decryption key (key). Alternatively, the lock and key may be associated with user biometric information, location data, or any other method for preventing access to the external memory unless a predetermined key or information is present.

In step 803, the designated key is retrieved from storage on the media player device. The key may be stored on an internal memory or register in the media player. In step 804, if the proper key has been presented to disable the locking function, then the content is transferred from the external memory to an internal memory on the media player device. The content may include any media files that can be played or accessed by the media player, such as music, electronic books, movies, music videos, pictures and the like.

In step 805, the content is deleted from the external memory after all of the content has been transferred to the internal memory on the media player. The deletion of the content in step 805 is optional in one embodiment and may be configured, for example, by the media player user, the media player manufacturer, the content provider, or some other entity. The deletion of the content on the external memory may include, for example, removing data from a file allocation table or directory table, overwriting data on the external memory, reformatting the external memory, or the like.

In step 806, a second lock is applied to the external memory after the content has been transferred to the internal memory. The second lock may be associated with a key that is not present on the media player device. The second lock may be held by another entity, such as a content or external memory provider or a media player manufacturer. Alternatively, the second lock may be randomly generated by the media player or some other entity so that the associated key is unknown. In one embodiment, the second lock is applied in order to render the external memory unusable by the media player or any other device. The application of the second lock is optional and, in one embodiment, might not be applied where, for example, the external memory content has been deleted.

The various systems and methods illustrated in the figures and described herein represent example embodiments of systems and methods for providing electronic content to residents of controlled-environment facilities. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

What is claimed is:

1. A portable computing device associated with a resident of a controlled-environment facility, the portable computing device comprising:
   a processor; and
   a first memory coupled to the processor, wherein the first memory is configured to store program instructions executable by the processor to cause the portable computing device to:
      determine that a second memory is coupled to the computing device, the second memory including a logic key configured to allow the portable computing device to access electronic content requested by the resident of the controlled-environment facility to the exclusion of other portable computing devices associated with other residents of the controlled-environment facility.

2. The portable computing device of claim 1, wherein the first memory is an external memory device.

3. The portable computing device of claim 1, wherein the second memory is coupled to the computing device over a network.

4. The portable computing device of claim 1, wherein the electronic content is transmitted to the computing device over a network.

5. The portable computing device of claim 1, wherein the electronic content is stored on the second memory.

6. A memory device comprising:
   a memory controller coupled to a memory module, the memory controller configured to retrieve a software key stored in the memory device, the software key configured to allow access to content requested by a resident of a controlled-environment facility by a portable computing device associated with the resident of the controlled-environment facility to the exclusion of another portable computing device not associated with the resident of the controlled-environment facility, the retrieval of the software key in response to the memory device being accessed by the portable computing device.

7. The memory device of claim 6, wherein the memory device comprises an external memory device.

8. The memory device of claim 6, wherein the memory device is accessed by the portable computing device over a network.

9. The memory device of claim 6, wherein the content requested by the resident of the controlled-environment facility is accessed by the portable computing device over a network.

10. The memory device of claim 6, wherein the electronic content is stored on the memory device.

11. The memory device of claim 6, wherein the memory controller is further configured to cause the content to be blocked or deleted in response to the memory device having been inserted into a portable computing device not associated with the resident of the controlled-environment facility.

12. The memory device of claim 6, wherein the memory controller is further configured to cause an alert to be generated in response to the memory device having been inserted into a portable computing device not associated with the resident of the controlled-environment facility.

13. The memory device of claim 6, further comprising:
a biometric signature stored thereon, wherein the memory controller is further configured to enable the portable computing device to access the content in response to the biometric signature matching biometric information obtained by the portable computing device.

14. The memory device of claim 6, further comprising:
a physical location designation stored thereon, wherein the memory controller is further configured to enable the portable computing device to access the content in response to the physical location designation matching location information obtained by the portable computing device.

15. A non-transitory tangible computer-readable storage medium having program instructions stored thereon that, upon execution by one or more computer systems, cause the one or more computer systems to:
receive, from a resident of a controlled-environment facility, a request for electronic content; and
store a key onto a memory device external to a portable computing device, the key associated with the portable computing device, the key configured to allow access of the electronic content by the portable computing device and to disallow access of the electronic content by other portable computing devices associated with other residents of the controlled-environment facility.

16. The non-transitory tangible computer-readable storage medium of claim 15, wherein the program instructions, upon execution by the one or more computer systems, further cause the one or more computer systems to:
store the requested electronic content onto a memory device.

17. The non-transitory tangible computer-readable storage medium of claim 15, wherein the program instructions, upon execution by the one or more computer systems, further cause the one or more computer systems to: identify a content access restriction associated with the resident of the controlled-environment facility; and store an instruction onto the memory device indicative of the content access restriction, the instruction configured to either block or delete the content from the memory device in response to the memory device having been inserted into a portable computing device not associated with the resident of the controlled-environment facility.

18. The non-transitory tangible computer-readable storage medium of claim 15, wherein the program instructions, upon execution by the one or more computer systems, further cause the one or more computer systems to:
identify shipping information usable to cause the memory device to be physically delivered to the resident within the controlled-environment facility.

19. The non-transitory tangible computer-readable storage medium of claim 15, wherein the program instructions, upon execution by the one or more computer systems, further cause the one or more computer systems to:
transmit the content to the memory device over a communications network.

20. The non-transitory tangible computer-readable storage medium of claim 15, wherein the program instructions, upon execution by the one or more computer systems, further cause the one or more computer systems to: receive a biometric signature associated with the resident of the controlled-environment facility; and store the biometric signature onto the memory device, wherein the portable computing device is configured to allow access to the content in response to having received biometric information matching the biometric signature.

21. The non-transitory tangible computer-readable storage medium of claim 15, wherein the program instructions, upon execution by the one or more computer systems, cause the one or more computer systems to: receive a location designation associated with the resident of the controlled-environment facility; and store the location designation signature onto the memory device, wherein the portable computing device is configured to allow access to the content in response to having received current location information matching the location designation.

22. A method, comprising:
detecting a first memory coupled to a media player device;
identifying a first lock applied to the first memory, the first lock configured to prevent access to content on the first memory unless a designated key is present;
retrieving the designated key stored on the media player device;
transferring the content from the first memory to a second memory coupled to the media player device; and
applying a second lock to the first memory after the content has been transferred to the second memory.

23. A method, comprising:
detecting a first memory coupled to a media player device;
identifying a lock applied to the first memory, the lock configured to prevent access to content on the first memory unless a designated key is present;
retrieving the designated key stored on the media player device;
transferring the content from the first memory to a second memory coupled to the media player device; and
deleting the content from the first memory after the content has been transferred to the second memory.

24. The method of claim 23, further comprising:
applying a second lock to the first memory after the content has been transferred to the second memory.

* * * * *